April 2, 1963 L. H. MARTIN ET AL 3,084,334

DIRECT ACCESS PHOTOMEMORY FOR STORAGE AND RETRIEVAL OF INFORMATION

Filed April 29, 1959 7 Sheets-Sheet 1

INVENTORS.
LOUIS H. MARTIN.
EDWARD J. LUCAS.
BY Alden D. Redfield
Charles M. Hogan.
ATTORNEYS.

April 2, 1963 L. H. MARTIN ET AL 3,084,334

DIRECT ACCESS PHOTOMEMORY FOR STORAGE AND RETRIEVAL OF INFORMATION

Filed April 29, 1959 7 Sheets-Sheet 2

INVENTORS.
LOUIS H. MARTIN.
BY EDWARD J. LUCAS.
Alden D. Redfield
Charles M. Hogan.
ATTORNEYS.

INVENTORS.
LOUIS H. MARTIN.
EDWARD J. LUCAS.
BY Alden D. Redfield
Charles M. Hogan
ATTORNEYS.

INVENTORS.
LOUIS H. MARTIN.
EDWARD J. LUCAS.
BY Alden D. Redfield
Charles M. Hogan
ATTORNEYS.

INVENTORS.
LOUIS H. MARTIN.
EDWARD J. LUCAS.
BY Alden D. Redfield
Charles M. Hogan
ATTORNEYS.

INVENTORS.
LOUIS H MARTIN.
EDWARD J. LUCAS.
BY Alden D. Redfield
Charles M. Hogan.
ATTORNEYS.

INVENTORS.
LOUIS H. MARTIN.
EDWARD J. LUCAS.
BY Alden D. Redfield
Charles M. Hogan.
ATTORNEYS.

United States Patent Office 3,084,334

Patented Apr. 2, 1963

3,084,334

DIRECT ACCESS PHOTOMEMORY FOR STORAGE AND RETRIEVAL OF INFORMATION

Louis H. Martin, Concord, and Edward J. Lucas, Cochituate, Mass., assignors to Avco Corporation, Cincinnati, Ohio, a corporation of Delaware Filed Apr. 29, 1959, Ser. No. 809,669
6 Claims. (Cl. 340—173)

The present invention relates to systems for information storage and retrieval, and particularly to those premised on photographic storage media.

The invention provides, in combination: means for photographic storage of a large number of units of information, a read out, a digital address system for selecting or ordering the presentation of any desired information unit either on the site of the storage means or at a remote location, mechanisms for withdrawing the selected unit from storage and registering the information unit and the read out, a digital servo system for precisely controlling the operation of the mechanisms in response to the commands of the digital address system, and, optionally, electrical means connected to the read out for displaying the information at a remote location.

The principal objects of the invention are to provide:

(1) An information storage and retrieval system of large storage capability, on the order of millions of pages of printed material;

(2) A system which affords rapid and direct access to any selected information unit without making an indirect and slow approach, as by sorting cards or reeling out film;

(3) A system which does not require manual handling of microfilm rolls or card stacks;

(4) A system in which the storage volume is small, so that ambient conditions such as atmosphere, dust, and temperature can easily be controlled;

(5) A system in which the photographically stored information units are isolated from each other and may therefore be of high resolution;

(6) A system in which the desired information unit is selected by binary code commands;

(7) A system in which the desired information unit may be electronically scanned for visual presentation at a subscriber station or other remote point;

(8) A flexible system in which additions and deletions of information units may be made with facility;

(9) A system in which registration is accomplished by a high-speed digitally controlled servo system.

For a better understanding of the present invention, together with other and further objects, advantages, and capabilities thereof, reference is made to the following description of the accompanying drawings, in which.

*Information Storage*

Figure 1:
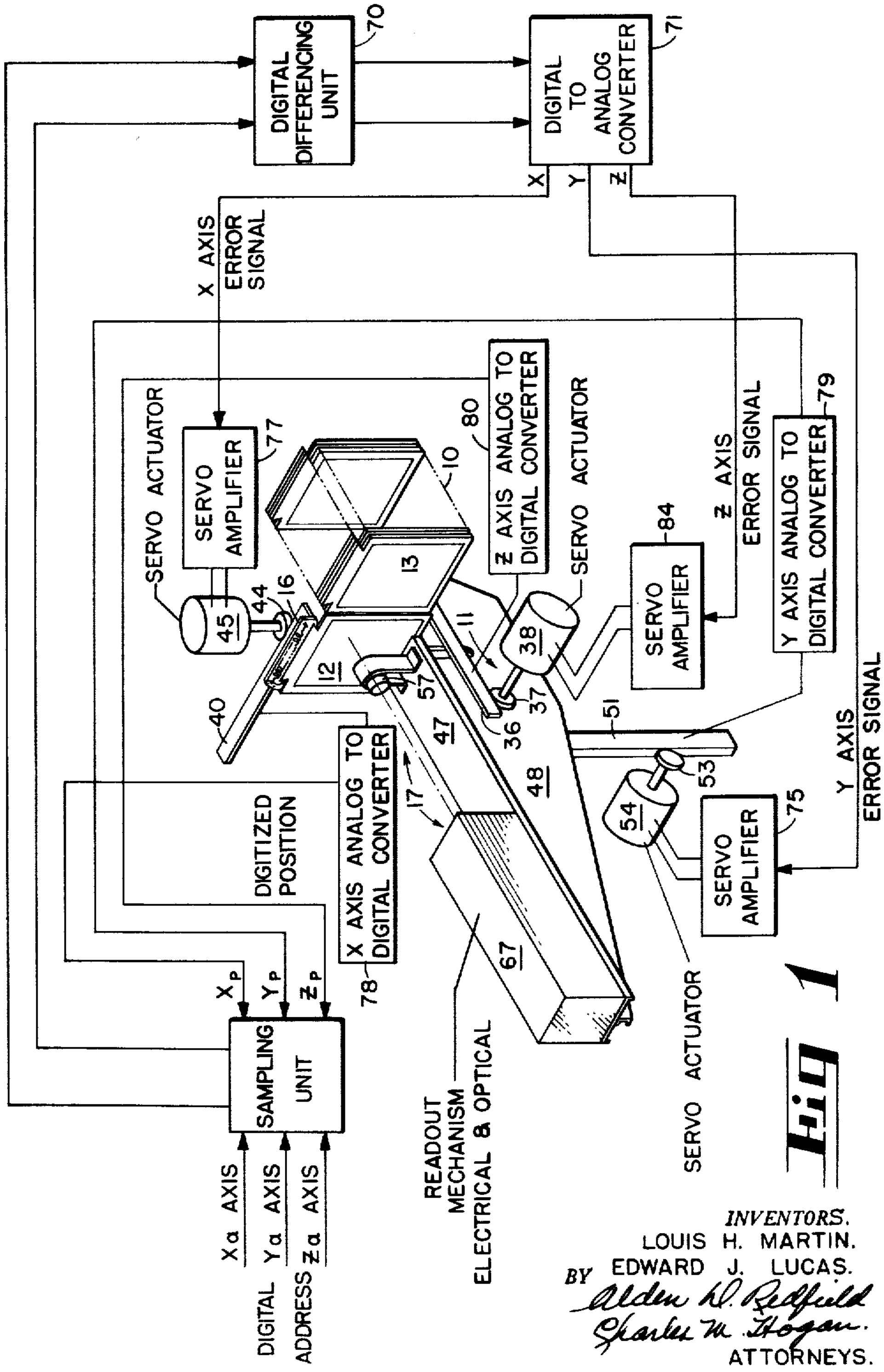
FIG. 1 is a system diagram of the invention, showing the principal mechanical elements in skeletonized and perspective form, and the principal electrical control units in block diagram outline.

Viewed in one aspect, the invention comprises a carrier or storage plate magazine 10 (FIGS. 1 and 2), first reciprocally operable means (11, 36, etc., described below) for mounting the magazine for controlled fore-and-aft translatory movement in the plane of or parallel to the Z axis of a Cartesian framework, a plurality of data-storage panels or plates (12, 13, etc.) disposed in the magazine, each of the panels comprising a plurality of rectangular photographic emulsions (14, 15, etc., FIG. 3) arranged in columns and rows and constituting information units, second reciprocally operable means (16, etc., described below) for controlled positioning of a selected data-storage panel along the lateral or X axis of that framework; read-out means; and third reciprocally operable means (47, 48, 51, etc., described below) for controlled positioning of the read-out means in the plane of or parallel to the vertical or Y axis of said framework.

The over-all operation of the system is such that, when a particular information unit is ordered in digital language, that unit and the readout—by controlled independent translations of the magazine, the selected information panel, and the read out, in three mutually perpendicular directions—are brought into registry, so that the unit may be optically viewed or electronically scanned.

The magazine 10 and flat panels 12, 13, etc., contain the page information or documentation, stored on the small fields 14, 15, etc., of photographic emulsion, arranged in columns and rows. The storage panels are disposed in parallelism in the magazine, their flat surfaces being parallel to the Y axis. The read out is indicated at 17 (FIGS. 1, 2).

Photographic emulsion offers the following advantages as a storage medium: high information storage density, ability to store any item that can be imaged with a camera lens on the storage field, and the possible use of several graduations in the film density to increase storage capacity. Furthermore, practical photographic processing techniques and material are readily available. The use of photographic storage is, of course, not restricted to storage of ordinary printing, drawing, and pictures. Coded fields made up of light and dark areas may be provided in order to obtain direct communication between digital data processing systems and the file.

A capacity equivalent to at least one million pages is desirable for the permanent store. Each field corresponds to an 8½ inch by 11 inch page and should have sufficient resolution to provide legible reproduction of 8 point type on a one-to-one scale.

Figures 2, 3:
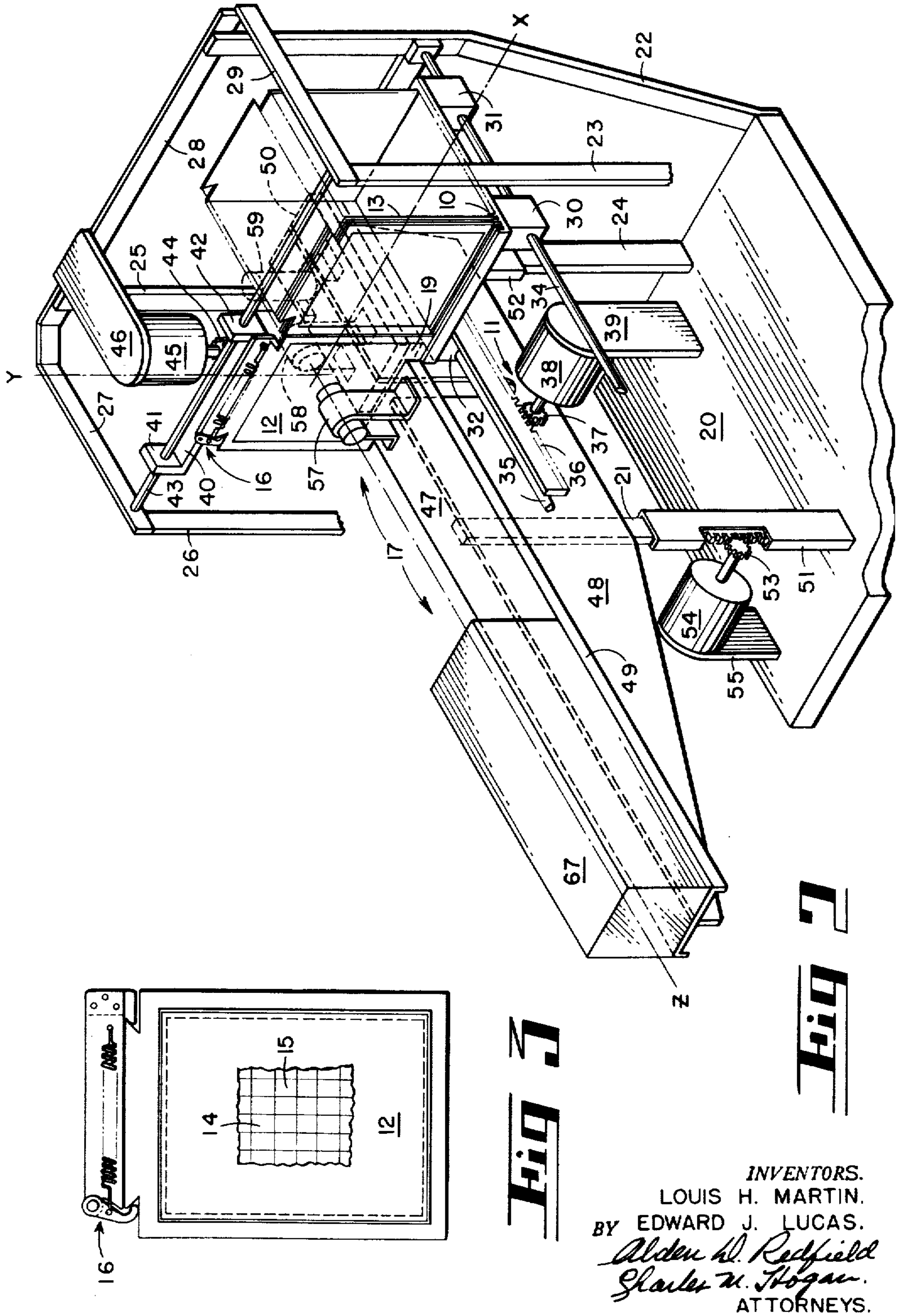
FIG. 2 is a perspective view of a preferred form of mechanical storage and retrieval apparatus in accordance with the invention.
FIG. 3 is a plan view of a typical information storage panel, a plurality of which are, in accordance with the invention, used in the FIG. 2 apparatus.

The basic file storage panel 12 is shown in FIG. 3. The storage area on the data-storage panel consists of a fine grain photographic plate, such as 12, approximately 8 inches by 10 inches. This plate may be one continuous sheet of emulsion or it may be made up from a number of rectangular pieces of film that can be individually attached to a transparent plate. These pieces of film may contain varying numbers of storage fields and may be processed individually. Eastman Kodak Type 649 emulsion has resolving capabilities of 25,000 lines per inch when properly exposed and developed. This storage area is divided up into 10,000 storage fields, such as 14, which are approximately 0.08 inch by 0.1 inch. Each of these small fields or information units contains a photographic image of a page. The top of the film storage plate frame is shaped so that a transfer arm 16 can engage the plate.

The storage plate magazine 10 holds 100 film storage plates. These plates are separated from each other by guide slots formed in the magazine, as indicated in FIG. 2. The top of the magazine 10 is open so that panels can be manually removed or inserted. The magazine has one degree of controlled linear freedom; it is slidably mounted to translate over a range equal to the length of the magazine.

*The Retrieval Mechanism*

The essential elements of the retrieval mechanism are shown, in combination, in FIG. 2. It comprises the storage-panel magazine 10, the panel transfer device 16, and the read out 17, all slidably mounted for their respective controlled translations. Support is provided by a structural framework comprising a foundation 20, upstanding legs 21, 22, 23, 24, 25, and 26, and braces 27, 28, and 29.

The magazine is slidably mounted for fore-and-aft translation by being secured to bearings, such as 30, 31, and 32, slidably fitting on guide rods 34 and 35, the guide rods extending fore-and-aft and being rigidly secured to the supporting framework. When an information unit is selected, the magazine 10 is positioned by a Z translatory movement until the desired information storage panel is aligned with slot 19, which slot is located at the plane of the X and Y axes. The magazine is positioned by a rack 36-pinion 37 mechanism, driven by a servo motor 38, secured to the base 20 by a bracket 39.

The selected data storage panel is, after being brought into alignment with slot 19, picked up and moved laterally in the stationary reference plane i.e., in translation along the X axis, for the purpose of aligning the column of the desired information unit with the read-out or Y axis. This is accomplished by suitable transfer means comprising a pick-up arm 16, secured to a rack 40, suspended from bearings 41, 42. The pick-up arm is suitably formed and actuated to grasp the desired panel, transport it and position it as ordered, and return it to storage on command. Bearings 41, 42 slidably fit on a guide rod 43, rigidly secured to the supporting framework. The pick-up arm or hook 16 is positioned by a rack 40-pinion 44 mechanism, driven by a servo motor 45, secured to the supporting framework by a bracket 46.

The read-out means or optical transducer collectively indicated by the reference numeral 17 in FIGS. 1 and 2 (and described below in further detail particularly with reference to FIG. 5) is secured to a table 47, and the two portions of this table are in turn secured to a rigid support member 48. The table consists of a front portion 49 and a rear portion 50, each bearing portions of the read-out system. The entire ensemble comprising the read out 17 and the members 47, 48, and 49 is slidably mounted for vertical translation on members 21 and 52, these members being provided with complementary telescoping guide members 51 and 24. Member 21 is formed as a rack with external teeth in mesh with a pinion 53, which in turn is driven by a servo motor 54 secured to the base by a bracket 55. Thus it will be seen that the read out is positioned for controlled translatory movement in the plane of or parallel to the Y axis of the framework of Cartesian coordinates. The proper row of the desired information unit and the read out are brought into final registration by the conjoint lateral translation (i.e. columnar positioning) of the selected information storage panel and vertical translation (i.e., row positioning) of the read out.

It will be understood that the specific mechanisms herein shown in elementary and symbolic form are only illustrative and are not disclosed by way of limitation on the true scope of the invention as defined in the appended claims.

In the specific embodiment of the invention herein shown, the sequence of operations is such that the Z and Y translations first occur, and the Y and X translations next occur. That is to say, upon the making of an address to the system, as when the selection of a desired information unit is made, the magazine 10 moves in a fore or aft direction to align the desired panel with the reference plane of slot 19. This translation is accompanied by the first phase of the vertical translatory motion of the read-out means. After the desired information panel is lined up with slot 19, it is laterally transferred along the X axis at the same time that the read out goes through the last phase of the Y translation, so that the approaches to row and columnar registration are made simultaneously. Because of the inertia possessed by the pick-up or read out system, this cycle of operation is greatly advantageous in speeding up response.

It will, of course, be understood that, prior to the execution of the command for a selection, the transfer arm 16 of the FIG. 2 mechanism returns any undesired panel back to the information storage carrier 10.

*Electronic Visual Read Out*

Figure 5:
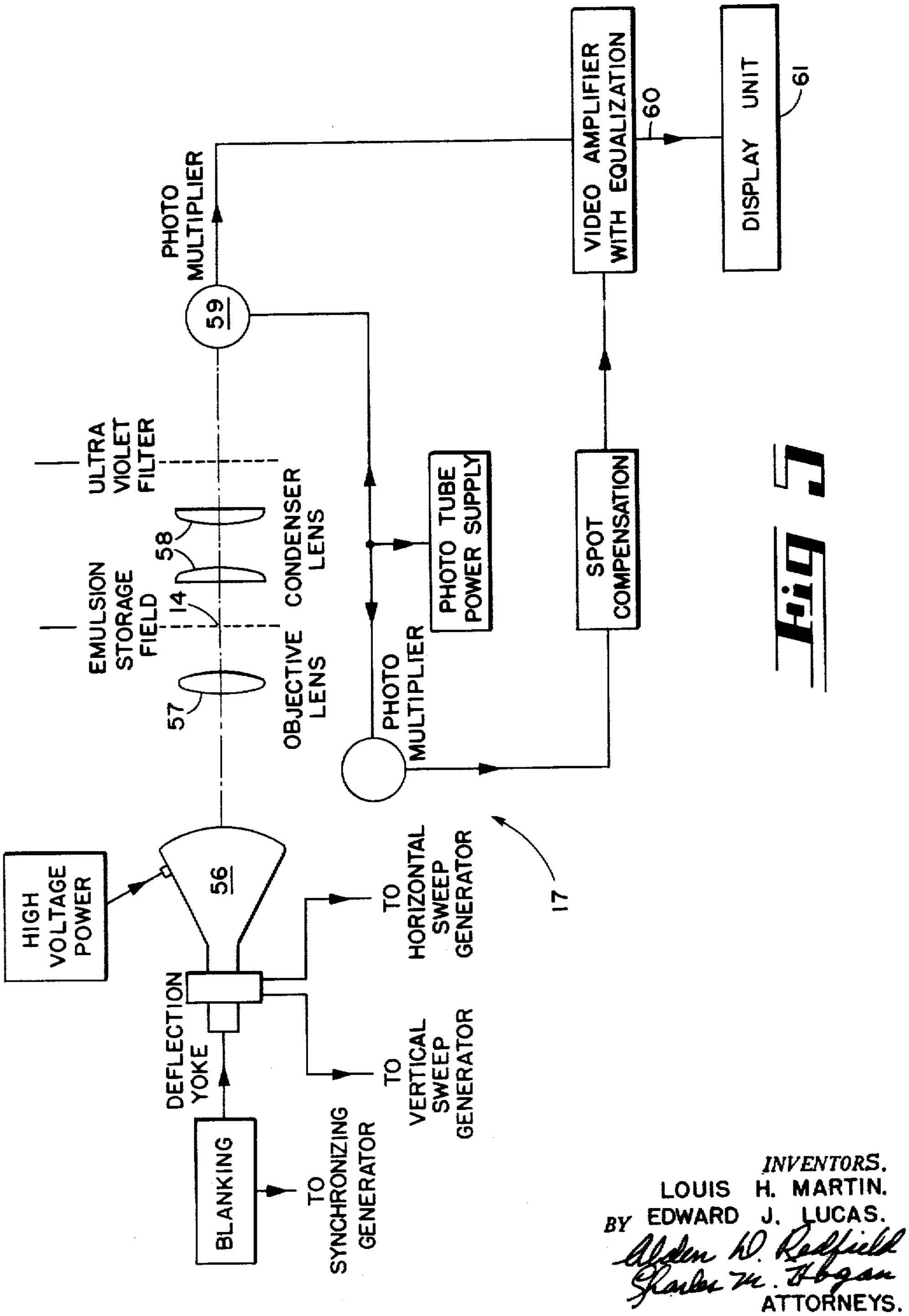
FIG. 5 is a block diagram of a flying-spot scanner electronic read out employed in the retrieval system in accordance with the invention.

Reference is now made to FIG. 5 for a block diagram of a flying-spot type of scanner generally indicated by the reference numeral 17 in FIGS. 1 and 2. Flying-spot scanners or cameras are well known to the television art and are commonly used for televising still pictures from slides and the like. Such scanners are described in detail in the following publications, to which reference is made: Television Engineering, Fink, pages 91–95, McGraw-Hill Book Company, New York, 1952; Elements of Television Systems, Anner, pages 204–208, Prentice-Hall, New York, 1951; Television, Zworykin and Morton, pages 259–261, Wiley & Sons, Inc., New York, 1954.

The flying-spot scanner generally indicated by the reference numeral 17 in FIGS. 1 and 2 comprises a cathode ray tube 56 (FIG. 5) which is provided with a conventional deflection yoke and associated with the usual blanking pulse generator and vertical and horizontal sweep signal generators—all in the manner shown in Fig. 64 at page 94 of the Fink text cited above. The cathode ray tube is housed by 67 (FIG. 1). A flying spot of illumination is generated on the phosphor of cathode ray tube 56 and is caused to mark out the scanning raster by magnetic deflection. The moving light spot is focused on the photographic emulsion storage field (such as that numbered 14 in FIG. 3, and often referred to a "slide" or "transparency") by an objective lens 57 (FIG. 5). The light passing through the slide is collected in a condensing lens system 58, which focuses it on the cathode of a multiplier phototube 59. An ultra violet filter may be interposed between the condensing lens and the photo multiplier in order to eliminate trailing of brightness values due to persistence of the phosphor. Spot compensation and equalization of features are provided in conventional fashion, and the video output signals are available on line 60.

Light from the scanning spot on the cathode ray tube passes to the phototube 59, and there excites a photoelectric current, the varying magnitude of which depends on the different degrees of optical transmission of the various elements of the transparency, representing the highlights, half-tones, and shadows of information. These variations are reproduced in the photo-electric current, which is multiplied in several stages of electronic multiplication within the phototube 59. The output current at 60 constitutes the picture signal corresponding to the transparency 14.

The electronic pick-up or flying-spot scanner illustrated in FIG. 5 is coupled in conventional fashion to a suitable display unit 61, located at any convenient point which the information unit is to be selected and viewed, which may be a point remote from the automatic file or near by. The units 60 and 61 comprise any suitable conventional closed-circuit television system, many of which are well known to the television art and described in texts such as the Anner publication cited above. The display unit comprises a cathode ray picture tube, suitable detection equipment and power supplies, and arrangements for the amplification and detection of the video signals sent out on line 60. Further, a plurality of subscriber stations and display units may be employed. Each display unit is preferably placed in the same location as a selector device for ordering the display of the desired information unit.

*Purely Optical Visual Read Out*

Figure 6:
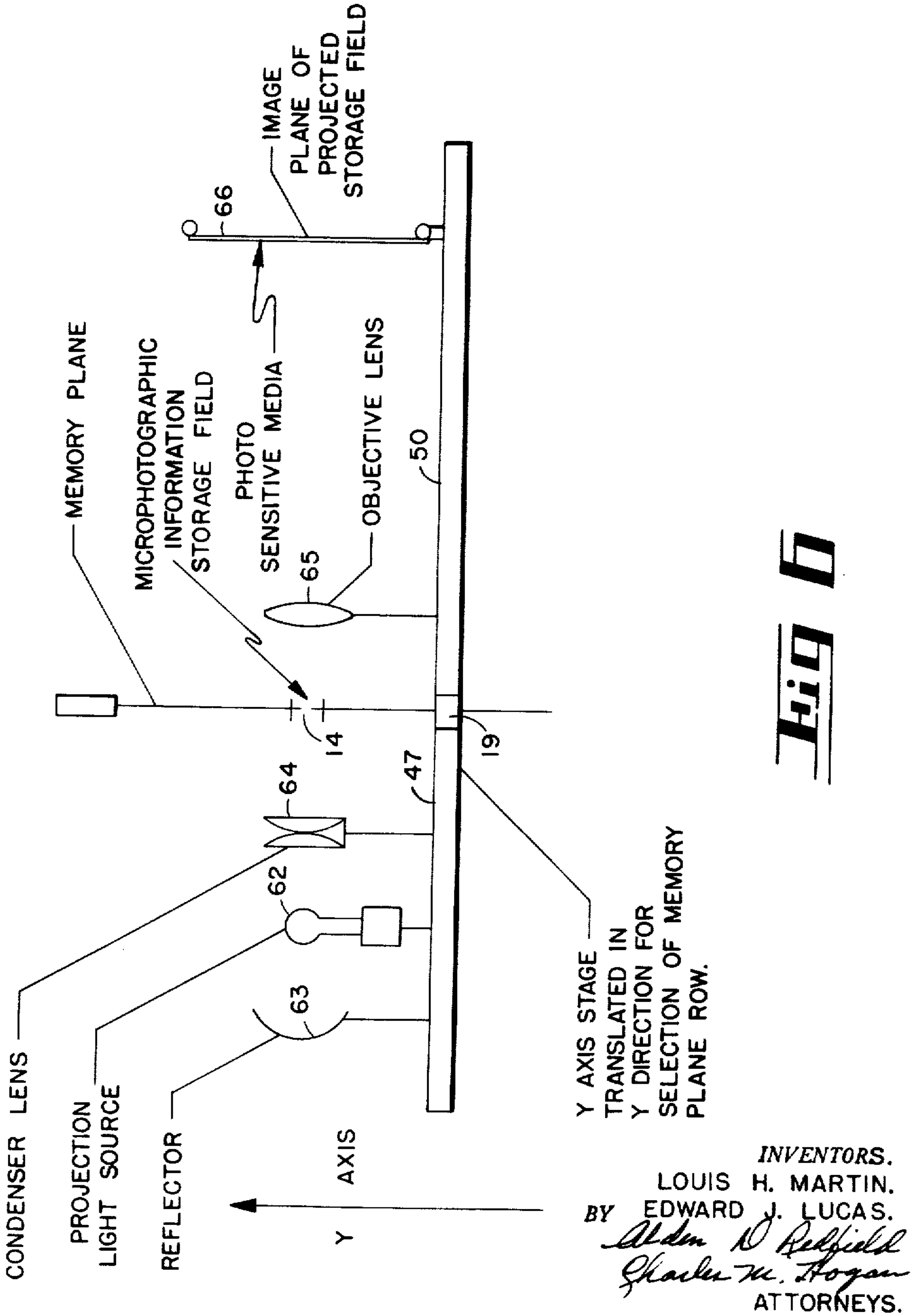
FIG. 6 is a block diagram of a purely optical read out which is optionally used in our retrieval system.

A read-out device different from that just described can be employed, as illustrated in FIG. 6. The FIG. 6 read out is an optical projector comprising the following elements, arranged in conventional fashion: a light source 62, a reflector 63, a condenser lens 64, an objective lens 65, and a photosensitive screen 66, the latter being suitably isolated to shield it and the optical path from stray light. The legend "Memory Plane" in FIG. 6 designates the selected information storage panel—for example, No. 12—and the reference numeral 14 designates the transparency or desired information unit.

*The Over-All Electro-Mechanical System*

Reference is made to FIG. 1 for an over-all diagram showing the relationship between the mechanical parts and the electrical address and control arrangements which position the parts. The electrical system per se is illustrated in system concept in FIG. 4, and the discussion which follows relates to those two figures.

The first reciprocating mechanism for displacing the magazine 10, the second reciprocating mechanism for transferring the desired information storage panel or memory plane into columnar position, and the third reciprocating mechanism for displacing the read out into row position were described above. Each of these mechanisms is provided with an analog-to-digital converter for electrically indicating present instantaneous position digitally. The Z, X, and Y converters are, respectively, associated with these mechanisms, and the converters are indicated in block outline in FIG. 1 by the reference numerals 80, 78, and 79, respectively. A wide choice of converters is available, and the installation of converters for indicating the positions of controlled elements is well within the knowledge of the art, so that those conventional aspects need not be further described herein.

The invention further includes a digital address system (generally indicated by the reference numeral 110 in FIG. 7) for producing order signals indicative of desired positions of the controlled carriage, panel, and read out. The address system includes a suitable selector arrangement manipulated by the operator to furnish binary code commands identifying the desired information unit, so that appropriate X, Y, and Z orders are produced. The selector means may be located near the automatic file or at a remote point proximate to a viewing station.

In other words, the selector means supplies electrical pulses corresponding to the digits required to specify a particular page in the permanent storage—i.e., a particular information unit in a particular panel. In a typical application, six decimal digits are designated in making the selection, and the system includes appropriate arrangements for decimal-to-binary conversion, which need not be shown in detail herein.

It will be understood that the code address or command signals could be supplied by digital computers, switching control networks, switches, magnetic tape, punched paper tape, punched cards, or any type of digital control or data processing device with digital output signals. Any digital address system for producing order signals indicative of desired positions of the registerable read out and information unit relative to the three coordinate axes may be employed.

Figure 4:
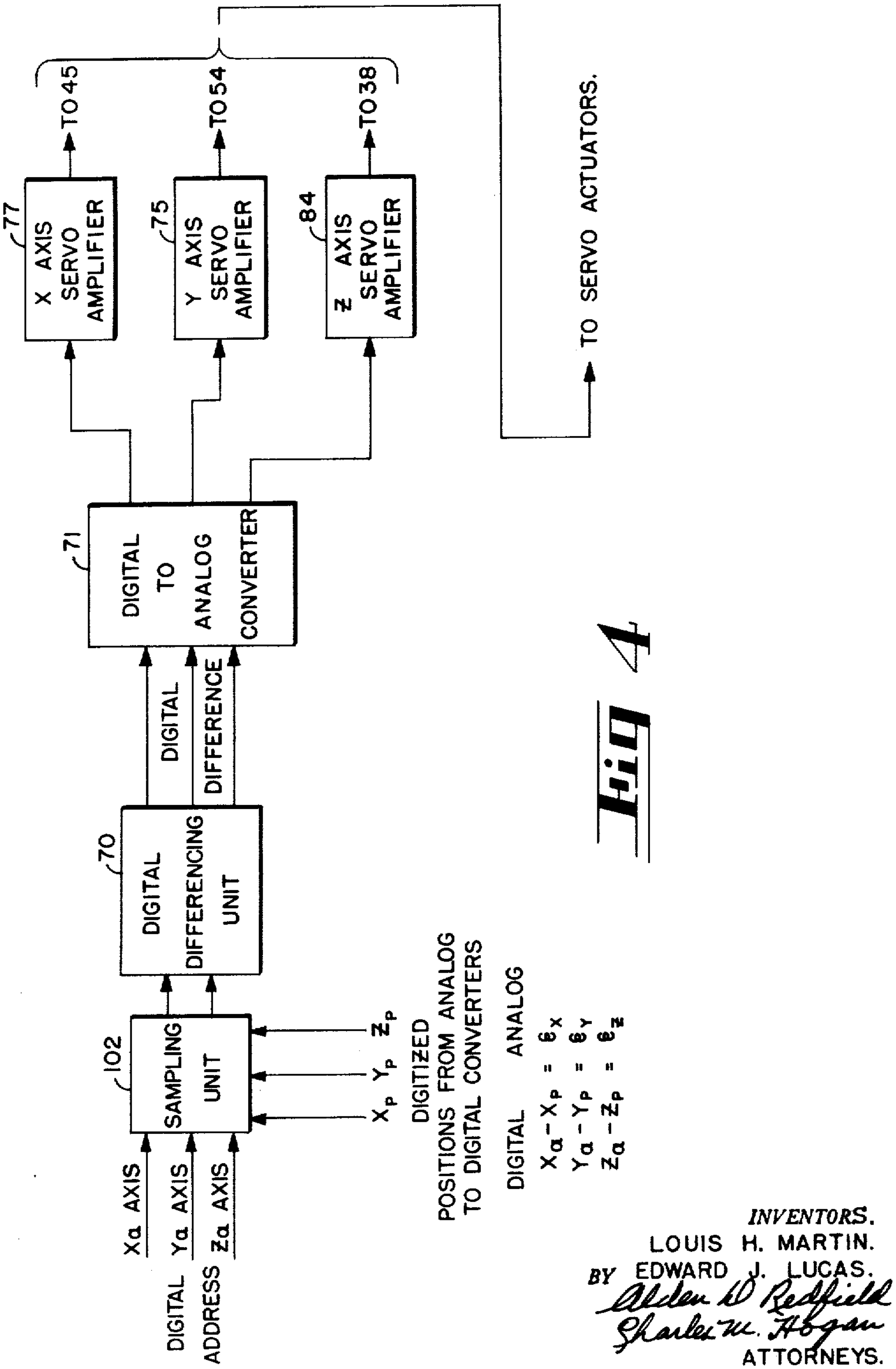
FIG. 4 is a generalized block diagram of the digital servo system in accordance with the invention.

As indicated in FIG. 4, there is also provided means 70 for deriving the digital differences between the order or command signals and the present-position or feedback signals. The invention further includes means 71 for converting the digital differences into analog-type error signals. By reason of parallel arithmetic operations and time-sharing arrangements described below, the digital-to-analog converter 71 furnishes to the X, Y, and Z servo amplifiers analog-type error signals, and these amplifiers drive the servo actuators 45, 54, and 38, respectively, so that the reciprocating mechanisms are controlled to drive the read-out means and the desired information unit into registration.

Figure 7:
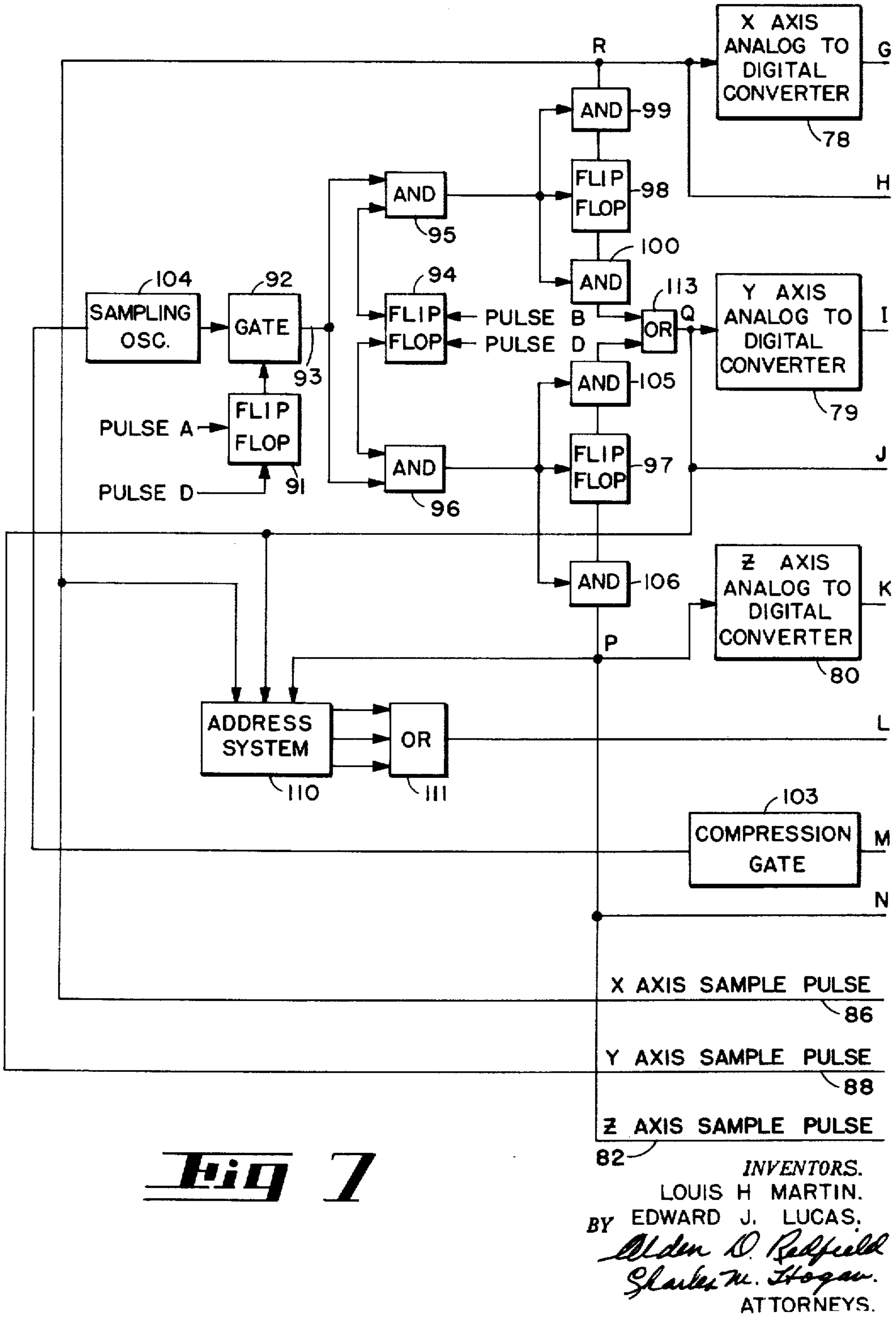
FIGS. 7 and 8, taken together, constitute a block diagram showing of the digital controls, digital address system, logical and arithmetic operators, and the servo systems, all in accordance with the invention.
Figure 8:
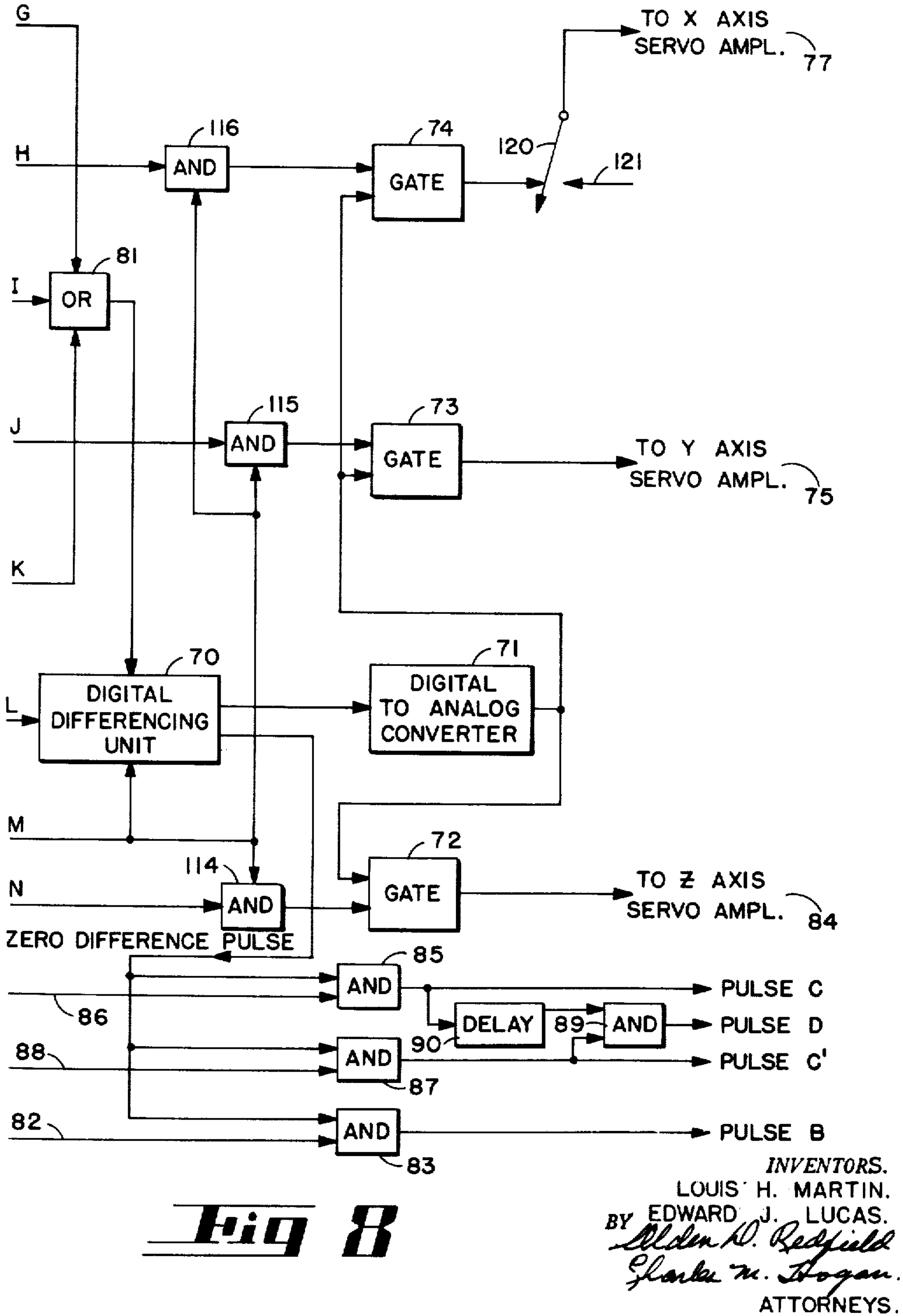

The relationships of the digital address system and other controlling units to the servo amplifiers are shown in further block diagram detail in FIGS. 7 and 8, and it will be understood that FIGS. 1 and 4 are greatly simplified in terms of blocks characterizing the principal functional units.

The description now proceeds to a discussion of the operation of the control circuitry, which will be followed by a description of structure, this particular practice being convenient in this instance.

*Operation of the Control Circuitry*

As in every servo system of the general type under consideration, a major functional unit is a device for producing error signals which indicate the difference between the order (i.e., the desired position of the controlled element or elements) and response (i.e., the actual or present instantaneous position of the controlled element or elements). This function is performed in our system by the digital differencing unit 70. This unit produces error pulse signals in digital form, and they are applied to a digital-to-analog converter 71 to convert the binary output of the digital differencing unit into analog form. The analog-form output signals of the time-shared digital-to-analog converter 71 are utilized to drive the three controlled mechanisms in such directions as to bring X, Y, and Z positions of the controlled elements into correspondence with the X, Y, and Z orders. Accordingly, the unit 71 may be thought of as a unit which produces X, Y, and Z orders on a time-sharing basis and in analog form.

In the specific embodiment under consideration, the positioning of the carriage in the plane of the fore-and-aft Z axis is followed by the transfer of the selected data-storage panel along the lateral X axis, but the positioning of the optical read out in the plane of or parallel to the vertical Y axis goes on at the same time as the other two positioning functions. This operation is controlled by time-sharing arrangements now to be described.

Parenthetically, the analog output signals of converter 71 are first alternately gated by gate circuits 72 and 73 (FIG. 8) to the Z axis servo amplifier 84 and the Y axis servo amplifier 75, contemporaneously to position the magazine and to move the read out toward the desired position. Then such analog error signals are alternately gated by gates 74 and 73 between the X axis servo amplifier 77 and the Y axis servo amplifier 75 to transfer the desired data storage panel into proper columnar position and to complete the registration of the read out with the desired row.

It is fundamental in zero error control systems that there be provided means for indicating present positions of the controlled elements to the differencing unit. The X axis analog-to-digital converter 78 (FIG. 7), Z axis analog-to-digital converter 80, and Y axis analog-to-digital converter 79 furnish feedback signals, in binary form, indicative of present positions of the desired data storage panel, the carrier, and the visual read out, respectively, to the digital differencing unit, via an "or" circuit 81 (FIG. 8), which in essence is a three-branch convergence. The arithmetic operations in the digital differencing unit are performed in parallel, and a compression gate 103 (FIG. 7) is interposed in the system (in an output circuit of sampling oscillator 104) to operate in conjunction with differencing unit 70 and "and" circuits 114, 115, and 116.

The compression gate 103 produces a pulse whose leading edge is slightly delayed in time from and narrower than the sampling oscillator pulse. It is used to eliminate arithmetic errors that might occur at the leading and trailing edges of the sampling pulses due to circuit delays.

Since the sequence of operations calls for successive positioning of the carriage and the panel but positioning of the read out simultaneous with the other two positioning functions, the system provides means for indicating when the various positioning functions have been completed. That is to say, when the carriage reaches the ordered position, the digital differencing unit 70 applies to an "and" circuit 83 (FIG. 8) a pulse coincident with a Z-axis sample pulse applied to said circuit along the line 82, and the "and" circuit 83 produces an output pulse B. This pulse B is an indication that the carriage is in position. It controls a series of operations whereby the positioning of the information-storage panel is initiated and that of the readout continues. Similarly, when the desired data-storage panel is in position, the digital difference unit 70 produces a zero difference pulse, and it is applied to an "and" circuit 85 in coincidence with an X-axis sample pulse applied to the same "and" circuit through line 86, so that the "and" circuit 85 produces an output pulse C indicative of appropriate columnar positioning of the selected panel. Continuing, when the read out reaches its desired position, the digital differencing unit 70 produces an output pulse applied to an "and" circuit 87 in coincidence with Y-axis sample pulses applied to such "and" circuit along line 88, and the "and" circuit 87 produces an output pulse C′ indicative that row registration has been achieved and that the read out is in its ordered position.

Upon composite attainment of their desired positions by both the data storage panel and the pick-up, pulse C has been applied to an "and" circuit 89 via a delay network 90, and pulses C′ are also supplied to such "and" circuit 89 to produce an output pulse D indicative of the realization of this composite and final registration.

A starting pulse A is provided and applied to flip-flop 91 (FIG. 7) to initiate the entire operation. The first step of control is a time-shared control of the Z and Y axis servos. Pulse B causes the second stage of control to be a time-shared control of the X and Y axis servos. When registration is achieved, pulse D is applied to flip-flop 91 as a reset pulse which restores quiescent conditions.

The system operation is initiated by flip-flop circuit 91, (FIG. 7), which, together with a gate circuit 92, functions as an "on-off" switch to pass pulses from a sampling oscillator 104, via line 93, to a steering or routing circuit group. A starting pulse A is applied to "switch" 91—92 to turn it on. Pulse D, indicative of registration, is applied to "switch" 91—92 to turn it off.

"And" circuits 95 and 96 and flip-flop 94 of the routing group function as a single-pole, double-throw switch, to pass pulses either to flip-flop 97, for Z and Y axis control, or to flip-flop 98, for Y and X axis control. Pulse D therefore places flip-flop 94 in that state which causes "and" circuit 96 to pass pulses. Similarly, pulse B, indicative that the Z axis command has been complied with, places flip-flop 94 in its other stable state, and "and" circuit 95 then passes pulses. The net significance of this is that when the "switch" is effectively thrown in one direction, as by application of pulse D to flip-flop 94, "and" circuit 96 then is placed in condition to pass pulses which control the Z and Y axis movements. On the other hand, when the "switch" is thrown in the other direction, as by pulse B, "and" circuit 95 is placed in condition to pass pulses which control X and Y axis movements.

Flip-flop 97 alternately gates pulses through "and" circuits 105 and 106 to control the Y and Z axis movements, and flip-flop 98 alternately gates pulses through "and" circuits 99 and 100 to control the X and Y axis movements.

Pulse outputs from the 106, 100 and 105 collectively, and 99 "and" circuits, respectively, are referred to as "Z axis sample pulses," "Y axis sample pulses," and "X axis sample pulses," respectively, and perform the following functions respectively:

(1) *Excitation.*—Pulses from 106 conditioning the Z axis converter 80 for operation or energizing it, pulses from 105 or 100 passing through "or" circuit 113 similarly to excite the Y axis converter 79, and pulses from 99 exciting the X axis converter 78;

(2) *Gating of analog-form output error signals of system.*—Pulses from 106 (FIG. 7) combining with pulses from "compression gate" unit 103 in "and" circuit 114 (FIG. 8) to open gate 72 to the Z axis servo amplifier; pulses from 100 or 105 (FIG. 7) combining with pulses from "compression gate" 103 in "and" circuit 115 to open gate 73 (FIG. 8) to the Y axis servo amplifier; and pulses from 99 (FIG. 7) combining with pulses from "compression gate" 103 in "and" circuit 116 to open gate 74 (FIG. 8) to the X axis servo amplifier;

(3) *Combining.*—Pulses from 106, 100 and 105 collectively, and 99, respectively, combining with the output of the digital differencing unit 70 in "and" circuits 83, 87, and 85, respectively, to produce pulses B, C′, and C, respectively;

(4) *Gating of address system.*—Pulses from 106, 100 and 105 collectively, and 99, respectively, gating the address system 110 to permit the transmission of Z axis, Y axis, and X axis order signals to the digital differencing unit 70 through "or" circuit 111.

*The Structure of the Control System*

It has been shown that the invention provides the combination of three servo systems 77, 45 and 75, 54 and 84, 38 (FIG. 1) for positioning the read out and the selected information unit in registry by X, Y, and Z translations in an orthogonal framework, and a control arrangement (FIGS. 7 and 8) for operating the servo systems in such a sequence that the positioning is first accomplished by Z and Y translations and then by Y and X translations. FIGS. 7 and 8 fit together along lines G, H, I, J, K, L, M, N, 86, 88, and 82 into one schematic.

This sequence of events is controlled by circuitry now described.

Sample pulses are generated by a sampling oscillator 104 (FIG. 4), the output of which is coupled to a gate circuit 92. Gate circuit 92 has an input coupled to a flip-flop circuit 91 in such a way that a starting pulse, denominated A, places the flip-flop 91 in such a state as to open gate 92 to pass sampling pulses to line 93. Flip-flop 91 responds to a termination pulse D to close gate 92 so that sampling pulses do not appear on line 93. The flip-flop 91 and gate 92 are therefore in effect an "on-off" switch, responsive to a starting pulse A to pass sampling pulses to line 93 and responsive to a termination pulse D to prevent such passage of sampling pulses to line 93. Parenthetically, pulse A is supplied to flip-flop 91 when the selection of a desired information unit is made. Pulse D is supplied when the order has been filled and registry of read out and information unit achieved.

Now, assuming the presence of sample pulses on line 93, these pulses effect Z and Y operation during the first phase, and Y and X operation during the second phase. Accordingly, a two-branch routing circuit comprising "and" circuits 95 and 96 and flip-flop 94 is coupled to gate circuit 92. Flip-flop 94 responds to a pulse B, when carrier 10 has been positioned, to place "and" circuit 95 in condition to pass sampling pulses. Pulse D, the termination pulse, places flip-flop 94 in condition to pass sampling pulses through "and" circuit 96. Sampling pulses passing through "and" circuit 95 control the X and Y translations, while sampling pulses passing through "and" circuit 96 control Z and Y translations.

Each set of translations is controlled by time-sharing, so that sub-routing circuits are independently coupled to the "and" circuits 95 and 96. One sub-routing circuit comprises "and" circuits 99 and 100 and flip-flop 98. The other sub-routing circuit comprises "and" circuits 105 and 106 and flip-flop 97. The former sub-routing circuit is coupled to "and" circuit 95, and the latter sub-routing circuit is coupled to "and" circuit 96.

Flip-flop 97 cyclically changes its state to pass Z axis sampling pulses through "and" circuit 106, and Y axis sampling pulses through "and" circuit 105, so that the Z and Y translations are controlled on a time-sharing basis. After pulse B has been applied to flip-flop 94, sampling pulses then appear in the output of "and" circuit 95, and flip-flop 98 then alternately changes its state to pass X sampling pulses through "and" circuit 99 and Y sampling pulses through "and" circuit 100. Both "and" circuits 100 and 105 are coupled to an "or" circuit 113, in that both phases of operation involve Y translations. The net result is that, during the first phase of operation, Z sample pulses appear at point P, and Y sample pulses at point Q, in alternation, these points being the outputs of "and" circuit 106 and "or" circuit 113, respectively. Similarly, during the second phase of operation X and Y sample pulses appear in alternation at points R and Q, respectively, these being the outputs of "and" circuit 99 and "or" circuit 113, respectively. These sample pulse outputs are used to control the gating of order signals transmitted by the address system and digital error signals gated to the servo systems.

Thus it will be seen that the invention provides a source of sample pulses 104, a two-branch routing circuit 94, 95, 96 having a first branch 96 for Z and Y control and a second branch 95 for X and Y control; means 91, 92 responsive to a starting pulse A for passing sample pulses to said routing circuit and responsive to a completion pulse D for blocking said control pulses from said routing circuit. The invention further comprises means 94 in said routing circuit and set in response to an indication (pulse B) of compliance with the Z order to pass X and Y sample pulses through branch 95, and reset in response to an indication (pulse D) of compliance with all orders to pass Z and Y sample pulses through branch 96. A two-branch sub-routing means 97, 105, 106 is coupled to branch 96 for alternately passing Y and Z sample pulses, and another two-branch sub-routing means 98, 99, 100 is coupled to branch 95 for alternately passing X and Y sample pulses.

The routing and sub-routing circuitry just disclosed produces Z axis sample pulses at P, Y axis sample pulses at Q, and X axis sample pulses at R which are employed to time the two main phases of operation and rhythmically to gate the Z and Y systems during one phase of operation, and the Y and X systems during the other. After first describing the address system and analog-to-digital converter and the digital differencing unit, the gating circuits to which the outputs at P, Q, and R are applied will then be described.

Orders are initiated in an address system 110 for producing X, Y, and Z positional orders in digital form. X, Y, and Z analog-to-digital converters 78, 79, and 80 indicate present positions in digital form. The converters are accordingly coupled to the address system by feedback paths. As described above, the system has digital differencing means 70 for producing digital error output signals indicative of the differences between ordered and present positions of the elements. This unit 70 is coupled to the three converters via an "or" circuit 81 (FIG. 8). Differencing unit 70 further produces zero difference pulse output signals indicative of full compliance of the elements with the X, Y, and Z positional orders. The zero difference pulses are aplied to "and" circuits 85, 87, and 83 which are, accordingly, coupled to the differencing unit 70. The other output of digital differencing unit 70 is coupled to digital-to-analog converter means 71 for converting the digital error signals to X, Y, and Z error signals in analog form.

We have seen that the Z and Y servos operate during the first phase, and that the Y and X servos operate during the second phase. Accordingly, the timing of the application of the Z, Y, and X error signals into Z, Y, and X servos is gated by a first set of gate circuits 72, 73, and 74, respectively, each coupled to the converter 71. Z and Y analog error signals are alternately gated through gates 72 and 73 during the first phase of operation, and Y and X signals are similarly gated through 73 and 74 during the second phase of operation. Accordingly, point P, at which Z axis sample pulses appear, is coupled to gate 72 via "and" circuit 114. Similarly, point Q, at which Y axis sample pulses appear, is coupled to gate 73 through "and" circuit 115. Further, point R, at which X axis sample pulses appear, is coupled to gate 74 through "and" circuit 116.

In similar fashion, points P, Q, and R are connected to the address system 110 to control therein a second set of gates (which need not be shown in detail herein), which second set of gates controls in the same manner the sequence and rhythm of the transmittal of Z, Y, and X digital orders to the digital differencing unit 70. To accomplish such transmittal, the address system 110 is coupled to the digital differencing unit via "or" circuit 111.

Additionally, the sample pulses at points P, Q, and R are employed to excite the Z, Y, and Z axes digital converter units, and those points are accordingly coupled to such units. The Z, Y, and X sample pulses are also applied to "and" circuits 83, 87, and 85, respectively, and there combined with appropriate zero difference pulses to produce the pulses indicative of completion of the various stages of operation. Accordingly, points P, Q, and R are also connected to the respective "and" circuits 83, 87, and 85.

*Subsidiary Features*

Referring now to a few subsidiary features: the output of sampling oscillator 104 is also applied to compression gate 103 suitably coupled thereto, and the compression gate is coupled to the digital differencing unit 70 and the "and" circuits 114, 115, and 116 for arithmetical operation purposes.

Pulse C is delayed and combined with pulse C' to develop pulse D. To provide for this operation, "and" circuit 85 is coupled to delay network 90, and the output of this network and the output of "and" circuit 87 are applied to "and" circuit 89 suitably coupled to both outputs. The purpose of this arrangement is to introduce a brief delay, after columnar registration is achieved, to assure that the read-out pick-up has achieved registration, before combining the indications of completion of the ordered X and Y translations to indicate final registration.

The generation of pulse D returns flip-flop 91 to the state that closes gate 92 and inhibits the passage of sampling oscillator pulses to line 93. This pulse D also returns flip-flop 94 to the stage at which branch 96 is open.

If an undesired information storage plate is in position to be viewed and a selection involves a new information plate, the coded signals should include a "change of address" pulse for throwing switch 120 from the position shown in FIG. 8 (in circuit between gate 74 and the X axis servo amplifier 77) into instantaneous contact with an element 121, connected to a suitable expedient which simply functions to return the undesired plate to storage position. The command for such return precedes the desired X, Y, and Z coding.

It will be understood from the foregoing that the sampling oscillator 104 and the associated routing and sub-routing circuitry out to and inclusive of points P, Q, and R, as shown in FIG. 7, are included in the block diagram designated "sampling unit" in FIG. 1.

The ability of this memory device to respond to digital command signals that specify the alignment of a specific discrete point in the storage media area with the optical read-out axis provides an important degree of flexibility in this device for storing information fields of various sizes and for reading magnified areas of a stored page.

The digital position registration system aligns the axis of the read-out system with any one of a number of discrete points on the memory planes. These points are distributed on a rectilinear coordinate system. Each one of these points is specified by a pair of binary address numbers that correspond to the X and Y rectilinear coordinates of the point. The separation Δ between each point along the X and Y coordinates corresponds with the least significant bit of the binary address numbers. By supplying the correct binary address number it is possible to align the optical reading axis with various points in the information storage plane or panel that are separated by any integral multiple of Δ up to the maximum length or width of the memory plane. This feature permits the arrangement of rectangular information storage fields that have varying widths and heights adjacent to one another. This results in variations in the center-to-center spacing between adjacent fields in both the X and Y coordinates and allows various storage field sizes to be accommodated without wasting storage areas on the memory plane. The alignment of the optical axis of the read-out mechanism with arbitrary points within an information storage field is also possible. This feature may be used to view different portions of an information storage field with increased magnification or resolution. This feature can be helpful in handling a page of information on which text is arranged in accordance with different types of formats or where fine details must be examined.

While there has been shown and described what is at present considered to be the preferred embodiment of the present invention, it will be obvious to those skilled in the art that various modifications and changes may be made therein without departing from the true scope of the invention as defined in the appended claims.

We claim:

1. In a tridimensional system for the storage and random retrieval of units of visual information, the combination of:

a movable information storage magazine;

a plurality of data-storage panels disposed in said magazine;

each data-storage panel comprising a pattern of of information units arranged in columns and rows;

an optical transducer comprising electronic scanning means;

and mechanical means for independently moving the magazine, a selected panel, and the transducer in three mutually perpendicular directions mechanically to register a selected information unit and said transducer, comprising:

means defining a stationary reference plane located at a fixed distance from said transducer, first reciprocally operable means for moving said magazine in the first of said directions to place the panel of the selected information unit in said reference plane, second reciprocally operable means for moving said panel in said reference plane and in the second of said directions to align the column of the selected information unit with said transducer, and third reciprocally operable means for moving said transducer in the third only of said directions and arresting it to register the row of the selected information unit with said transducer and to complete the third-dimensional selection of said information unit.

2. In a system for the storage and random retrieval of units of visual information, the combination in accordance with claim 1 in which the information units comprise photographic emulsions, and in which the optical transducer is a visual read-out device.

3. In a system for the storage and random retrieval of units of visual information, the combination in accordance with claim 2 in which the visual read-out device is a flying spot scanner.

4. In a system for the storage and random retrieval of visual information, the combination in accordance with claim 3 in which the first, second, and third directions are horizontal, lateral, and vertical, respectively.

5. In a control system, the combination of three servo systems for positioning elements in registry by X, Y, and Z translations in three-dimensional orthogonal framework, and a control arrangement for operating the servo systems in such a sequence that the positioning is first accomplished by Z and Y translations and then by Y and X translations, comprising: an address system for producing X, Y, and Z positional orders in digital form; X, Y, and Z analog-to-digital converters for indicating present positions in digital form; digital differencing means for producing digital error output signals indicative of the differences between ordered and present positions of the elements, and other output signals indicating zero differences upon full compliance of said elements with X, Y, and Z orders; digital-to-analog converter means for converting said difference signals into X, Y, and Z error signals in analog form; a first set of gates individual to the X, Y, and Z servo systems for applying the last-mentioned error signals thereto; a second set of gates for gating X, Y, Z and positional orders from the address system to the digital differencing means; and means for controlling the sets of gates so that Z and Y positioning is first accomplished and Y and X positioning is next accomplished, comprising: a source of sample pulses, a two-branch routing circuit having a first branch for said Z and Y control and a second branch for X and Y control, means responsive to a starting pulse for passing sample pulses to said routing circuit and responsive to a completion pulse for blocking said control pulses from said routing circuit, means in said routing circuit and set in response to an indication of compliance with the Z order to pass X and Y sample pulses through the second of said branches and reset in response to an indication of compliance with all orders to pass Z and Y sample pulses through the first of said branches, a two-branch sub-routing means coupled to the first of said branches for alternately passing sample pulses to the Z and Y address system gates and analog error output gates, another two-branch sub-routing means coupled to the second of said branches for alternately passing sample pulses to the Y and X address system gates and analog error output gates, and means utilizing the zero difference outputs of said differencing unit and the passed sample pulses to furnish indications of compliance with the X, Y, and Z orders.

6. In a control system, the combination of a carrier, a plurality of data-storage panels disposed in said carrier, each of said panels including a checkerboard of information units, a read-out device, three servo systems for positioning the read-out device and a selected information unit in registry by X, Y, and Z translations in a three-dimensional orthogonal framework, and a control arrangement for operating the servo systems in such a sequence that the positioning is first accomplished by Z and Y translations of the carrier and read-out device, respectively, and then by Y and X translations of the read-out device and the selected panel, respectively, comprising: an address system for producing X, Y, and Z positional orders in digital form; X, Y, and Z analog-to-digital converters for indicating present positions in digital form; digital differencing means for producing digital error output signals indicative of the differences between ordered and present positions, and other output signals indicating zero differences upon attainment of compliance with said orders; digital-to-analog converter means for converting said difference signals into X, Y, and Z error signals in analog form; a first set of gates individual to the X, Y, and Z servo systems for applying the last-mentioned error signals thereto; a second set of gates for gating X, Y, and Z positional orders from the address system to the digital differencing means;

and means for controlling the sets of gates so that Z and Y positioning is first accomplished and Y and X positioning is next accomplished, comprising: a source of sample pulses, a two-branch routing circuit having a first branch for said Z and Y control and a second branch for X and Y control, means responsive to a starting pulse for passing sample pulses to said routing circuit and responsive to a completion pulse for blocking said control pulses from said routing circuit, means in said routing circuit and set in response to an indication of compliance with the Z order to pass X and Y sample pulses through the second one of said branches and reset in response to an indication of compliance with all orders to pass Z and Y sample pulses through the first of said branches, a two-branch sub-routing means coupled to the first of said branches for alternately passing sample pulses to the Z and Y address system gates and analog error output gates, another two-branch sub-routing means coupled to the second of said branches for alternately passing sample pulses to the Y and X address system gates and analog error output gates, and means utilizing the zero difference outputs of said differencing unit and the passed sample pulses to furnish indications of compliance with the X, Y, and Z orders.

References Cited in the file of this patent

UNITED STATES PATENTS

| | | |
|---|---|---|
| 2,650,830 | Potter | Sept. 1, 1953 |
| 2,830,285 | Davis | Apr. 8, 1958 |
| 2,902,329 | Brink | Sept. 1, 1959 |
| 2,914,752 | MacDonald | Nov. 24, 1959 |
| 2,918,656 | Nolde et al. | Dec. 22, 1959 |

OTHER REFERENCES

Random Access Memory, by G. E. Comstock, Instruments and Automation, November 1956, pages 2208–2211.

UNITED STATES PATENT OFFICE

CERTIFICATE OF CORRECTION

Patent No. 3,084,334 April 2, 1963

Louis H. Martin et al.

It is hereby certified that error appears in the above numbered patent requiring correction and that the said Letters Patent should read as corrected below.

Column 4, line 64, before "which" insert -- at --; column 8, line 39, for "(FIG. 4)" read -- (FIG. 7) --; column 9, line 64, for "aplied" read -- applied --; column 11, line 17, for "areas" read -- area --; line 41, strike out "of"; column 12, line 7, after "in" insert -- a --; line 24, for "Z and" read -- and Z --.

Signed and sealed this 12th day of November 1963.

(SEAL)
Attest:

ERNEST W. SWIDER

Attesting Officer

EDWIN L. REYNOLDS

Acting Commissioner of Patents